ns Patent Office 3,508,293
Patented Apr. 28, 1970

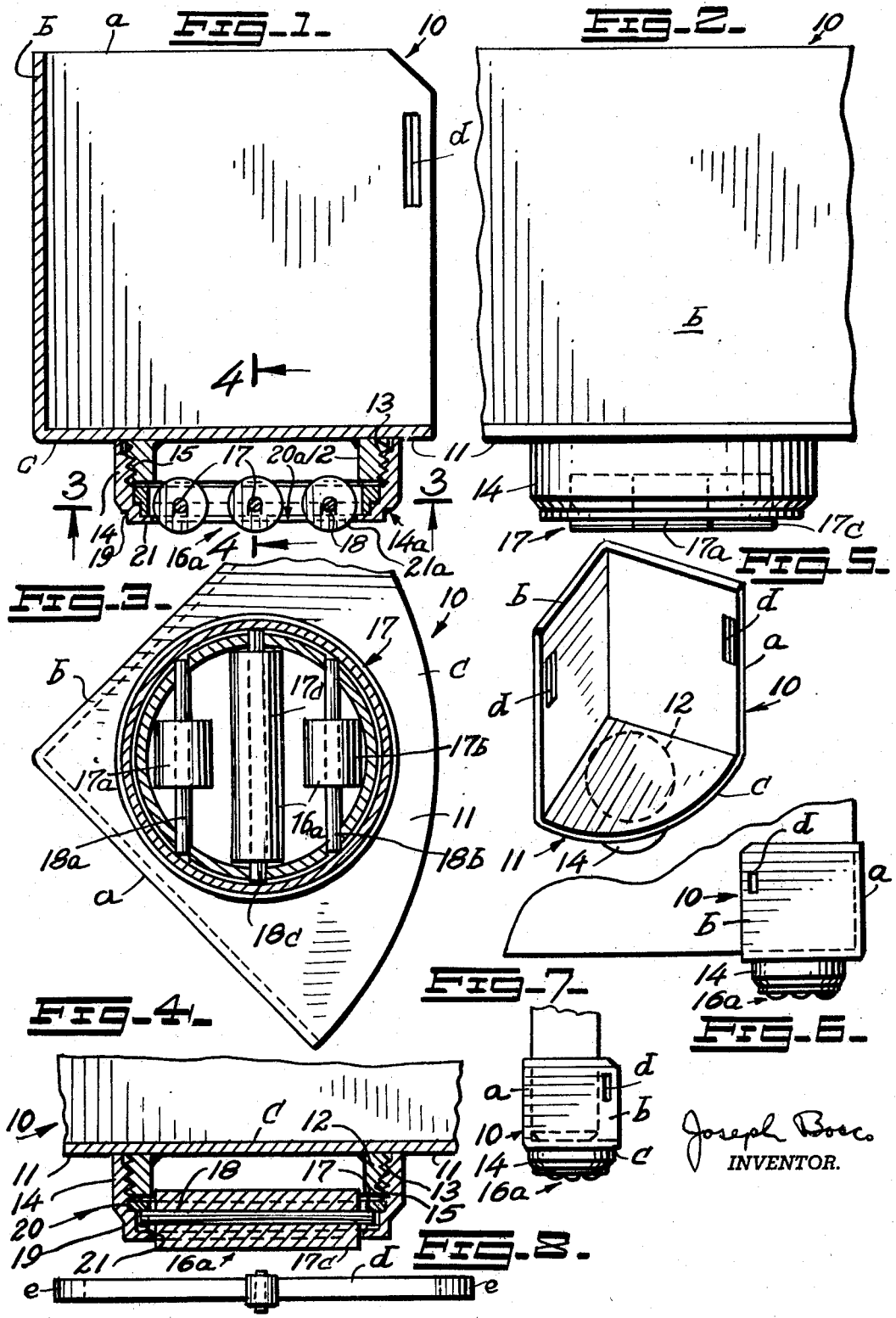

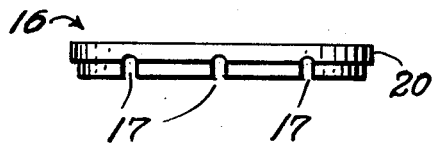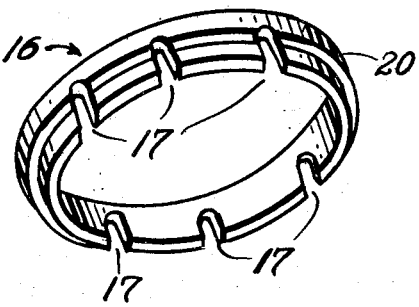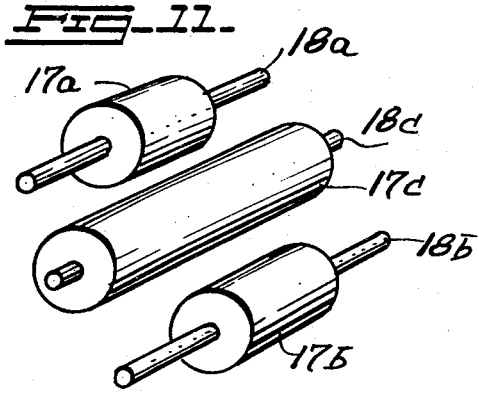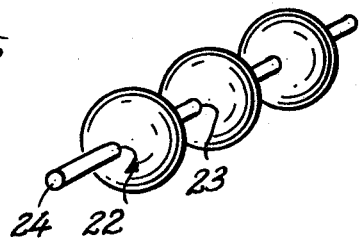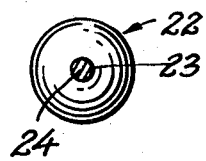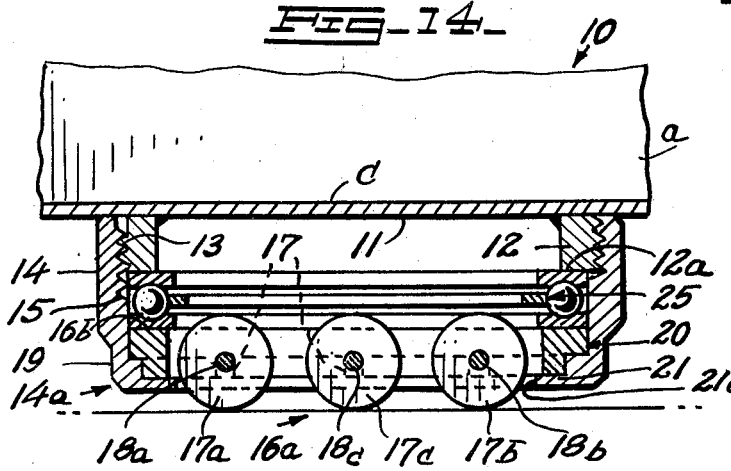

3,508,293
ROLLAWAY CASTER UNIT
Joseph Bosco, 31 Summer St., Everett, Mass. 02149
Filed May 27, 1966, Ser. No. 554,639
Int. Cl. B60b 33/00
U.S. Cl. 16—21                                              11 Claims

ABSTRACT OF THE DISCLOSURE

The invention relates to a roller caster and to an adaptable roller accessory device to help move about heavy loads with ease. The roller accessory is fitted with a thrust bearing to bear heavy loads and to permit easy swiveling and turning around when the load is moved from one location to another.

---

The present invention relates to roller casters, and more particularly it relates to a facile adaptable roller accessory devcie to help move about heavy and cumbersome loads with comparative ease. The main object of the present invention is to provide a roller caster unit having a low profile that may be attractive in appearance, and can be manufactured of variety of materials, sizes and designs to match the type and nature of the superimposed objects it is made to support, so as to form an esthetic whole. Notwithstanding the fact that the load it is supporting may be moved from place to place or remain stationary, the caster unit may remain affixed permanently to the load or may be readily removed therefrom.

Another object of the present invention is to provide a caster unit for moving about loads of any weight or size in a simple, efficient and effortless manner. The device in question may be readily mountable below any article or furniture, machine or any other body which need be moved about. The device provides a ready facility of affixing itself to the load to be moved about, and yet it is formed in such a fashion as to be readily removable if not desired for permanent use.

A further object of the present invention is to provide a caster unit which may be readily produced, packaged, and sold in large quantities at a comparatively low cost, and which can be conveniently utilized whenever needed with whatever the nature of the load desired for mobility.

Another object of the present invention is to provide a caster which may be fitted with a thrust bearing to bear heavy loads and to permit easy swiveling and turning around when the load is moved from one location to another.

This invention also consists in certain other features of construction, and the combination and arrangement of parts, to be hereinafter fully described, illustrated in the accompanying drawings, and specifically pointed out in detail in the appended claims.

In describing the invention in detail, references will be made to the accompanying figures where like character numerals denote like or corresponding parts throughout the several views, in which:

FIG. 1 is a side elevational view showing the embodiment of the present invention, in section;

FIG. 2 is a side elevational view of FIG. 1;

FIG. 3 is a bottom view of FIG. 1, in section taken on the line 3—3;

FIG. 4 is a section taken on the line 4—4 of FIG. 1;

FIG. 5 is a perspective;

FIG. 6 shows the application of the invention to large rectangular loads;

FIG. 7 shows the application of the invention to desk, chair, or other type loads;

FIG. 8 shows the adjustable fastening strip to help facilitate the mounting of the roller caster to the load to be moved, if wanted for permanency;

FIG. 9 is a front elevational view of the roller canister;

FIG. 10 is a view of the roller canister shown in FIG. 9, in perspective;

FIG. 11 is a perspective view showing a group of three cylindrical rollers which may be utilized as load carriers in the present invention;

FIG. 12 is a modification showing the utilization of a group of three steel balls in place of one single cylindrical roller indicated in FIG. 11;

FIG. 13 is a front elevational view of FIG. 12; and

FIG. 14 is a section taken through another modification showing a roller caster and the application thereto of a thrust bearing means.

It is understood that the present form of disclosure is merely for the purpose of illustration, and that there might be various modifications thereof, without departing from the spirit of the invention as herein set forth.

Referring now specifically to the drawings, unit 10 represents the roller caster device which may be formed in accordance with the present invention, best seen in FIG. 1, including in combination, with the rectangular vertical sides $a$ and $b$, and the semi-circular arcuate and substanially rectangle $c$, all three together forming the triangular body 10 of the roller caster proper. The two vertical rectangles $a$ and $b$, each have an elongated opening or slot $d$, in which may be affixed the ends of the strap $e$ (see FIG. 8) in the event that it may be necessary to secure the roller caster 10 fast to the load it may support (leg of a table, a chair or a heavy piece of furniture or machine).

The bottom section 11 of the semi-circular arcuate rectangle $c$, has a circular ring-shaped projection or base 12 which may be provided with an outer male thread 13 (machined upon its outer circumference) substantially as shown in FIG. 1. A mounting flange or an inverted screw cap-rim 14 having an internal female thread 15 is affixed (threaded) over the exterior of the male thread 13 in the base 12. The numeral 16 indicates the roller canister which can be provided and may support a group of cylindrical rollers 16a, in appropriate stud shafts 18 which are mounted to rotate in the slots 17. The individual rollers mounted upon their respective stud shafts turn freely in the canister 16. The inverted screw-on cap-rim 14 has a circular opening 20a through which protrude the rollers 16a.

It may be readily discerned from FIG. 1 that the roller canister 16 may be provided at its lower end 14a with a flange section 19, which may be machined to fit snugly under the ring-shaped member 20, of the roller canister 16, substantially as indicated. Furthermore, the mounting flange 14 has a shelve-like arcuate extension 21, which extends substantially below the flange 14 and serves as a support for the roller stud shafts 18, so as to prevent the latter from disengaging from their respective stud grooves 17.

From FIG. 3 it may be readily discerned that the group of rollers 16a comprise (in this case) the pair of shorter rollers 17a, and 17b, respectively, and the substantially longer roller 17c. Also it is readily apparent from the drawing that the rollers 17a and 17b may be provided with substantially shorter stud shafts 18a and 18b, while the longer roller 17c has a substantially longer shaft 18c. While FIG. 3 indicates the stud shafts 18a, 18b, and 18c as individual shafts, the latter may be replaced and instead each individual roller may be provided with stud extensions which may be readily machined from the either ends of each roller (not shown). The rollers 16a have reamed holes h, into which the stud shafts fit snugly to allow the cylindrical rollers to turn freely.

FIG. 12 illustrates a modification. In this case the group of rollers 16a may be replaced by a number of steel balls 22 which may be provided with centrally machined or reamed shaft holes 23. A stud shaft 24 may be mounted through the holes 23 to support the steel balls 22 in the canister 16, in the manner already described for FIG 1.

FIG. 14 is another modification showing the application of a thrust bearing to the caster shown in FIG. 1. It can be readily discerned from FIG. 14 that it is in all respects similar in design to FIG. 1. However, in the latter case a thrust bearing 25 is now housed below the mounting floor 12 and in such a manner as to interpose itself between the lower floor section 12 and the upper circumference 16b of the roller canister 16. The application of the thrust bearing 25 will permit the support of heavier loads with ease and the effortless swiveling or turning of the load upon the caster body.

The operation of the roller caster device will now be readily understood. By simply affixing the caster 10 to any solid piece of machinery, furniture or body with or without legs, the latter may be moved with ease from place to place. One removable caster unit may be mounted to each leg of a furniture piece and as many casters may be provided as there are needed. Also the caster may be a permanent and an inherent part of the load itself and be made as a integral part thereof.

Although this invention is described as having vertical rectangular sides a and b, the caster, may however, as a variant to the basic concept of the present invention, also be constructed without the vertical sides. In a modification (not shown) the vertical rectangular sides may be formed hinged at their base so as to swivel downwards. Thus the device may be further expanded in its use in situations where more flexibility is required.

The weight of the load to be moved on the device serves to keep it held firmly in position on the roller caster. But if permanency of affixation is desired, adjustable straps (see FIG. 8) may be utilized by inserting the ends of straps into slots d, and tightened.

A careful examination of the foregoing description in connection with the invention as illustrated in the drawings, will enable the reader to obtain a clear understanding and impression of the alleged features of merit and novelty, sufficient to clarify the construction of the invention as hereinafter claimed.

Minor changes in shape, size and materials, and rearrangement of parts, may be restored to in actual practice, as long as no departure is made from the invention claimed.

Having described my invention, what I claim as new and original is the following:

1. A device of the class described, comprising a roller caster having a floor section, a roller mounting means having a base secured under said floor section, a group of rollers, stud shafts in said device, a roller retainer in said base, a set of vertical grooves facing each other in pairs, said stud shafts being mounted in said grooves, with one shaft in each pair of grooves, said rollers by means of said stud shafts being mountable in said retainer to rotate freely, and means for supporting said rollers in said retainer to prevent the disengagement of said rollers from said base.

2. A device of the class described comprising a carriage and a roller caster member having a floor section, a circular roller mounting base being secured below said floor section, an outer male thread located in said circular base, a group of three cylindrical rollers mounted in said base, each of the rollers having a hole fitting snugly over a stud shaft, a circular canister in said base, said canister being provided with slots located upon the outer circumference to receive said stud shafts, with two slots for each stud slot, with one slot facing the other slot, with the ends of each stud shaft being supported in each slot, means for preventing the disenagement of said stud shafts from said slot, said means comprising a circular shaft retainer, an internal thread in said retainer, said retainer being threaded over the outer thread in said base to hold fast said rollers in said slots to prevent the disengagement of said rollers from said base.

3. The combination according to claim 2; said roller canister having a circular shelve-like extension extending beyond and around the entire circumference of said canister with a circular section of smaller diameter being formed below said shelve-like extension above, a set of vertical grooves located in said small diameter section to receive and to hold said roller stud shafts, and a flange to support said canister in said device.

4. The combination according to claim 2; said flange having a circular shelve-like extension extending beyond the shelve-like extension in said canister, said first extension being interposed below the shelve-like ring section in said canister to support said canister in said flange.

5. The combination according to claim 2; said flange having a substantially circular shelve-like extension facing inwardly to extend beyond and below the ends of said stud shafts to prevent said shafts from disengaging from said roller canister.

6. The combination according to claim 2; and a thrust bearing mounted below the mounting base and located substantially above the roller canister, said bearing allowing said canister to turn freely in a horizontal plane.

7. The combination according to claim 2; and steel balls located in said canister, center holes in each ball, a shaft upon which said balls are being mounted to turn freely, and means for retaining said steel balls in said caster device.

8. In a device of the class described, including a pair of vertical side frames and a flat horizontal floor member, a base below the floor having a rectangular member with a male thread cut upon it, a thrust bearing being positioned below said surface, a roller retainer mounted below said bearing, vertical grooves in said retainer, a set of three stud shafts in said retainer fitted in said grooves and being mounted on either side equidistant from one another, a pair of short cylindrical rollers being mounted on either side of a longer cylindrical roller which is mounted in between the two shorter rollers, and means for retaining said rollers in said device, said means comprising a circular ring retainer, said ring retainer being provided with a female thread, said female thread being affixed over said male thread in the base to secure said roller retainer to said base.

9. The combination according to claim 8; said longer stud shaft having a set of three steel balls, each ball in the set having a centrally located opening, said balls being mounted each upon a stud shaft, and a single steel ball mounted in either side of said centrally located shaft, and means for retaining said steel balls to said device.

10. A caster device of the class described comprising, in combination, a triangular caster body having a pair of vertical sides and a rectangular bottom base, a mounting ring under said base, a male thread located in said base, a group of cylindrical rollers mounted on stud shafts, a roller canister upon which said shafts are mounted to turn freely, and means for mounting said canister to said caster device, said means comprising a circular ring retainer having an internal female thread, the threading of said ring retainer to said base mounting said cylindrical rollers and said roller canister to said caster device.

11. A group of cylindrical rollers being supported upon a group of stud shafts, a cylindrical canister having slots into which said stud shafts are supported at either end thereof, said stud shafts are supported in a horizontal position relative to the ground, said shaft group comprising a pair of shafts of shorter length and one shaft longer than the other two, the shorter shafts carrying a pair of shorter rollers, and the longer shaft carrying a roller which is longer than each of the shafts in said pair, a circular flange for supporting said rollers also included in said canister for the purpose intended.

References Cited
UNITED STATES PATENTS

| | | | |
|---|---|---|---|
| 86,543 | 2/1869 | Higley | 16—18 |
| 962,308 | 6/1910 | Burnett | 16—47 |
| 1,060,076 | 4/1913 | Glowacki | 16—47 |

BOBBY R. GAY, Primary Examiner

D. L. TROUTMAN, Assistant Examiner